United States Patent [19]

Chen

[11] Patent Number: 5,184,404
[45] Date of Patent: Feb. 9, 1993

[54] WIRE CUTTER

[76] Inventor: Ching-Jen Chen, No. 33-1, Luh-Tyi St., Panchiao City, Taipei Hsien, Taiwan

[21] Appl. No.: 891,831

[22] Filed: Jun. 1, 1992

[51] Int. Cl.$^5$ ............................................. B26B 13/00
[52] U.S. Cl. ........................................ 30/250; 30/249; 30/252
[58] Field of Search ................. 30/250, 244, 245, 249, 30/252, 192; 81/314

[56] References Cited

U.S. PATENT DOCUMENTS

| | | | |
|---|---|---|---|
| 3,210,844 | 10/1965 | Tontscheff | 30/250 |
| 4,178,682 | 12/1979 | Sadauskas | 30/250 |
| 4,223,439 | 9/1980 | Rommel | 30/253 |
| 4,378,636 | 4/1983 | Wick | 30/250 |
| 4,677,748 | 7/1987 | Kobayashi | 30/250 |

Primary Examiner—Douglas D. Watts
Assistant Examiner—Hwei-Siu Payer
Attorney, Agent, or Firm—Lucas & Just

[57] ABSTRACT

A wire cutter includes a fixed handle having an enlarged top end and a movable handle which has a top end pivoted to the enlarged top end and a gear unit stationarily provided on the top end. An elongated plate has a first end to which the gear unit is pivoted and a second end. A gear member is pivoted to the second end and meshes with the gear unit. A fixed cutting member includes a lower mounting portion fixed to the enlarged top end and an upper curved cutting portion. A curved movable cutting member is pivoted to the cutting portion and has one side formed with a toothed section. An extension spring is connected to the first end of the plate and the movable handle and biases the plate so that the plate inclines upwardly to permit engagement between the toothed section and the gear member. A pawl member is resiliently pivoted to the enlarged top end adjacent the gear member opposite to the gear unit. The pawl member normally engages the toothed section and permits movement of the movable cutting member toward the fixed cutting member.

3 Claims, 5 Drawing Sheets

, 404

WIRE CUTTER

BACKGROUND OF THE INVENTION

1. Field of the Invention

This invention relates to a cutting device, more particularly to a wire cutter.

2. Description of Reltated Art

Referring to FIGS. 1 and 2, a conventional wire cutter (W1) includes a fixed handle (A2), a movable handle (A1) pivoted to the fixed handle (A2) and a compression spring (C) having one end connected to the fixed handle (A2) and another end connected to the movable handle (A1). A curved fixed cutting member (B2) is fixed to the fixed handle (A2). A curved movable cutting member (B1) is pivoted to the fixed cutting member (B2) to form a variable hole (B3) therebetween for receiving a wire therein. The movable cutting member (B1) has one side formed with a toothed section (B13). A pushing member (A11) is pivoted to the movable handle (A1) and has two teeth (A12) formed thereon. A pawl member (A21) is resiliently mounted on the fixed handle (A2) adjacent to the pushing member (A11) and has a projection (A22). A control means (A3) is connected to the pushing member (A11) and the pawl member (A21) and normally biases them to cause the teeth (A12) and the projection (A22) to engage the toothed section (B13). The pawl member (A21) permits movement of the movable cutting member (B1) in a clockwise direction wherein the movable cutting member (B1) moves toward the fixed cutting member (B2) when the projection (A22) of the pawl member (A21) engages the toothed section (B13). When the movable handle (A1) is pressed toward the fixed handle (A2) from a normal position to a compressed position, the teeth (A12) of the pushing member (A11) causes the movable cutting member (B1) to pivot in the clockwise direction and thereby decrease the size of the variable hole (B3).

Since the pushing member (A11) only has two teeth (A12) to engage the toothed section (B13), the force applied on each of the teeth (A12) can easily wear the teeth when the movable cutting member (B1) pivots in the clockwise direction. Thus, the wire cutter (W1) has a short service life.

SUMMARY OF THE INVENTION

Therefore, the objective of this invention is to provide an improved wire cutter which has a long service life.

Accordingly, a wire cutter of this invention includes a fixed handle having an enlarged top end and a movable handle having a top end pivoted to the enlarged top end of the fixed handle. The top end is provided with a gear means which is stationary relative to the movable handle.

An elongated plate has a first end and a second end. The gear means is pivoted to the plate adjacent to the first end.

A gear member is pivoted to the plate adjacent to the second end and meshes with the gear means.

A fixed cutting member includes a lower mounting portion fixed to the enlarged top end of the fixed handle and an upper curved cutting portion.

A curved movable cutting member is pivoted to the cutting portion of the fixed cutting member to form a variable hole therebetween for receiving a wire therein. The movable cutting member has one side formed with a cutting section and another side formed with a toothed section.

An extension spring has one end connected to the first end of the plate and another end connected to the movable handle. The extension spring biases the plate so that the plate inclines upwardly to permit engagement between the toothed section of the movable cutting member and the gear member.

A pawl member is resiliently pivoted to the enlarged top end of the fixed handle adjacent to one side of the gear member opposite to the gear means. The pawl member normally engages the toothed section and permits movement of the movable cutting member in a first direction wherein the movable cutting member moves toward the cutting portion of the fixed cutting member.

BRIEF DESCRIPTION OF THE DRAWING

Other features and advantages of the present invention will become apparent in the following detailed description of the preferred embodiment with reference to the accompanying drawings, of which.

DETAILED DESCRIPTION OF THE INVENTION

Figure 1:
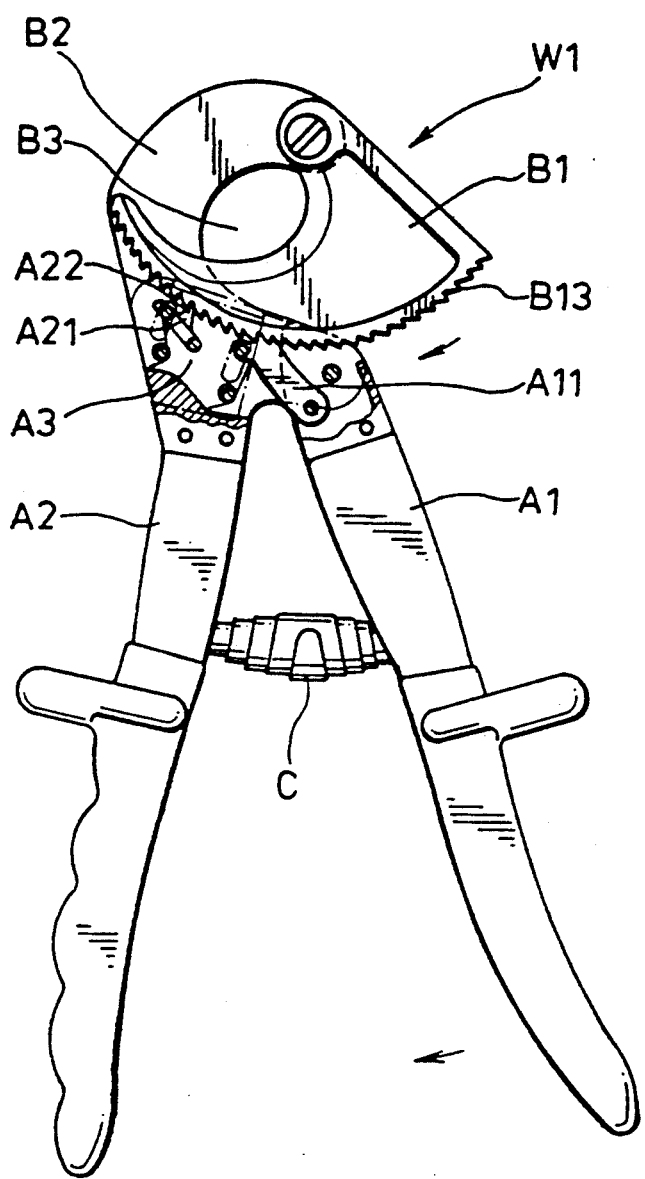
FIG. 1 is a schematic view of a conventional wire cutter.
Figure 2:
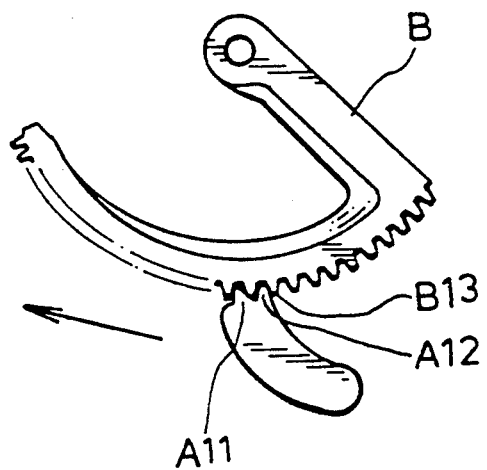
FIG. 2 shows engagement between the teeth of the pushing member and the toothed section of the movable cutting member when the movable cutting member moves toward the fixed cutting member.
Figure 3:
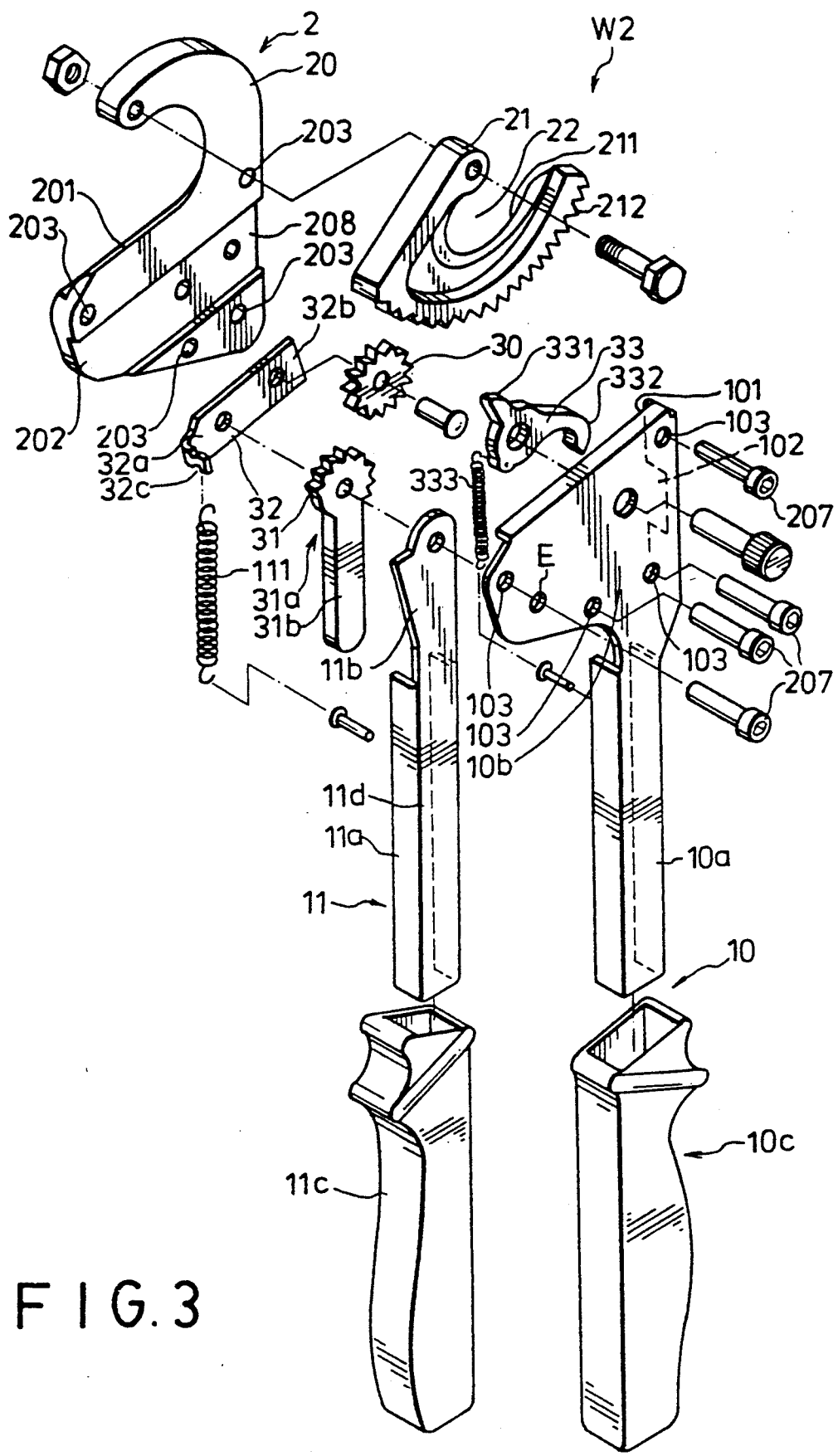
FIG. 3 is an exploded view of a wire cutter of this invention.
Figure 5:
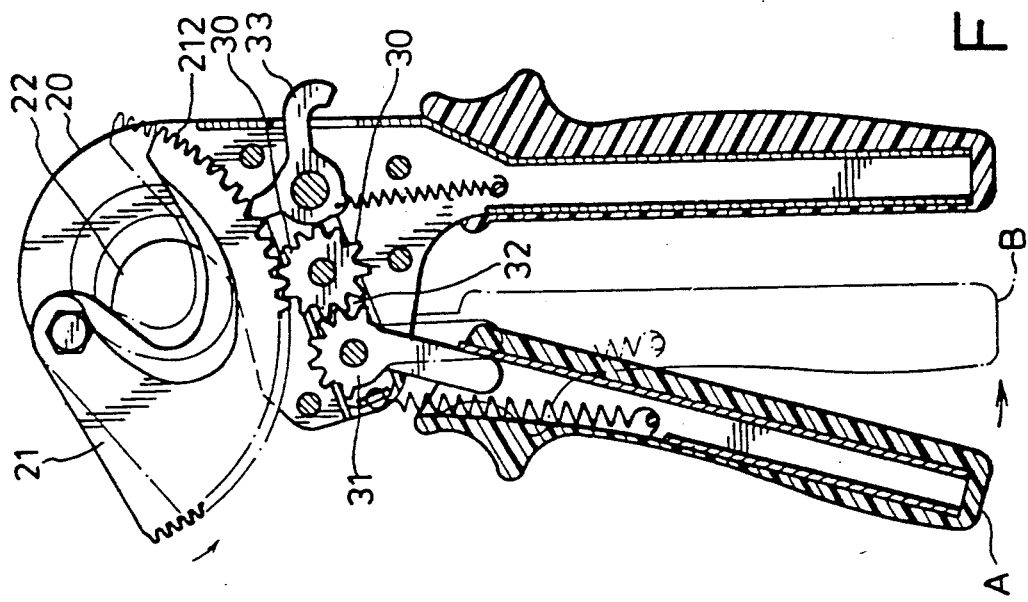
FIG. 5 is a sectional view of this invention showing engagement between the toothed section of the movable cutting member and the gear member and the pawl member when the movable handle is in a normal position.
Figure 4:
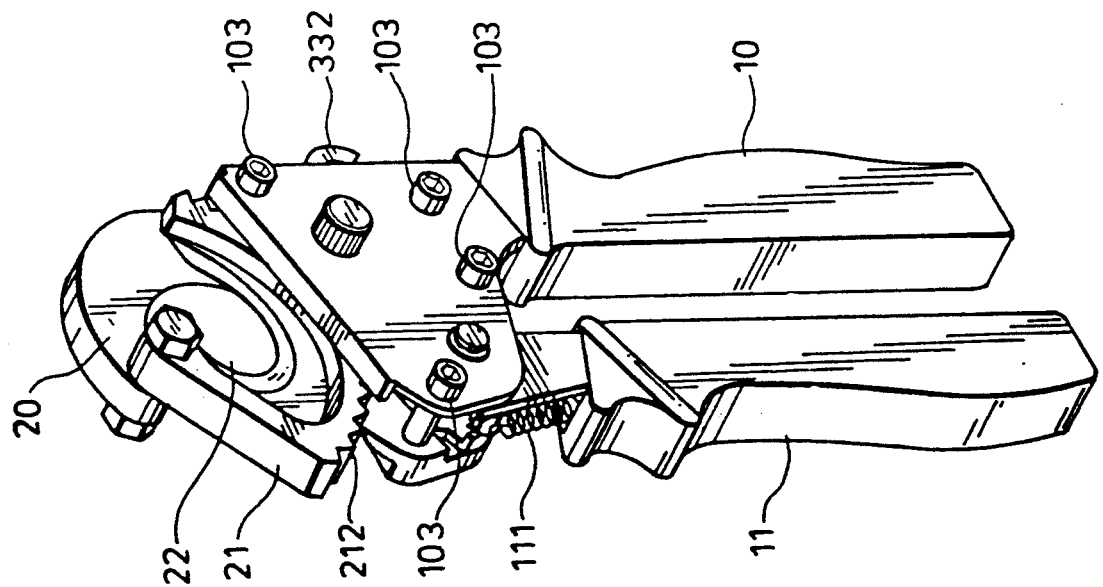
FIG. 4 is a perspective view of the wire cutter of this invention.

Referring to FIGS. 3 to 7, a wire cutter (W2) of this invention includes a fixed handle (10) having a lower portion (10a), an upper enlarged portion (10b) and a tubular gripping member (10C) sleeved around the lower portion (10a). A flange (101) extends from one side of the enlarged portion (10b) and has a recess (102) formed thereon. A movable handle (11) has a lower portion (11a) formed with an elongated groove (11d), an upper portion (11b), and a tubular gripping member (11c) sleeved around the lower portion (11a). A gear means (31a) has a gear portion (31) and a shaft portion (31b) extending from the gear portions (31). An elongated plate (32) has a first end (32a), a second end (32b) and a curved portion (32c) extending from the first end (32a). The upper portion (11b) of the movable handle (11), the gear portion (31) of the gear means (31a) and the first end (32a) of the plate (32) are pivoted to a hinge point (E) on the enlarged portion (10b) of the fixed handle (10) by a screw. The shaft portion (31b) of the gear means (31a) extends into and is frictionally received in the groove (11d) of the movable handle (11). The gear means (31a) is stationary relative to the movable handle (11). A gear member (30) is pivoted to the plate (32) adjacent to the second end (32b) thereof and meshes with the gear portion (31) of the gear means (31a). A fixed cutting member (2) includes a lower mounting portion (202), which is fixed to the enlarged portion (10b) of the fixed handle (10) by screws (207) respectively passing through holes (103) and holes (203), and an upper curved cutting portion (20) formed with a curved blade (201). The mounting portion (202) is formed with an elongated groove (208) to receive the plate (32) and has a width larger than that of the plate (32). A curved movable cutting member (21) is pivoted to the cutting portion (20) of the fixed cutting member (2) to form a variable hole (22) therebetween for receiving a wire (not shown) therein. The movable cutting member (21) has one side formed with a curved blade (211) and another side formed with a toothed section (212). An extension spring (111) has one end connected to the curved portion (132c) of the plate 32 and another end connected to the lower portion (11a) of the movable handle (11). The extension spring (111) biases the plate (32) so that the plate (32) inclines upwardly to permit engagement between the toothed section (212) of the movable cutting member (21) and the gear member (30). A pawl member (33) is resiliently pivoted to the enlarged portion (10b) of the fixed handle (10) and the mounting portion (202) of the fixed cutting member (20) adjacent to the gear member (30) and the flange (101). The pawl member (33) has a lever portion (332) extending out of the recess (102) and a projection (331). A spring (333) has one end connected to the pawl member (33) and another end connected to the lower portion (10a) of the fixed handle (10). The projection (331) of the pawl member (33) normally engages the toothed section (212) of the movable cutting member (21) and permits movement of the movable cutting member (21) in an anticlockwise direction wherein the movable cutting member (21) moves towards the fixed cutting member (20).

Referring to FIG. 5 again, the gear portion (31) of the gear means (31a) rotatably drives the gear member (30) when the movable handle (11) is pressed toward the fixed handle (10) from a normal position (A) to a compressed position (B) so as to cause the movable cutting member (21) to pivot in the anticlockwise direction and thereby decrease the size of the variable hole (22). The pawl member (33) resists movement of the movable cutting member (21) in a clockwise direction wherein the movable cutting member (21) moves away from the cutting portion (20) of the fixed cutting member (2) to cause the gear portion (31) of the gear means (31a) to urge the gear member (30) and the plate (32) to incline downwardly when the movable handle (11) is released from the compressed position (B) to the normal position (A) so as to permit disengagement between the toothed section (212) of the movable cutting member (21) and the gear member (30). The size of the variable hole (22) can be gradually decreased by means of continuous compressing for the movable handle (11) so as to cut the wire which is to be provided in the hole (22).

Referring to FIG. 6 again, since the pawl member (33) resists movement of the movable cutting member (21) in the clockwise direction, the gear portion (31) of the gear means (31a) urges the gear member (30) and the plate (32) to incline downwardly when the movable handle (11) is moved from the normal position (A) to a release position (C) so as to permit disengagement between the toothed section (212) of the movable cutting member (21) and the gear member (30). At the same time, the movable cutting member (21) can be moved away from the cutting portion (20) of the fixed cutting member (2) in the clockwise direction while the lever portion (332) of the pawl member (33) is pressed downward to permit disengagement between the projection (331) and the toothed section (212).

Figure 7:
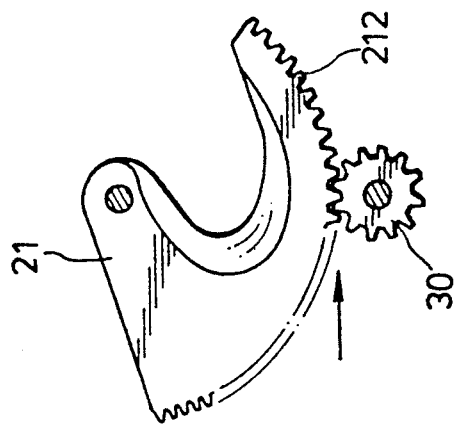
FIG. 7 shows engagement between the gear member and the toothed section of the movable cutting member when the movable cutting member moves toward the fixed cutting member.
Figure 6:
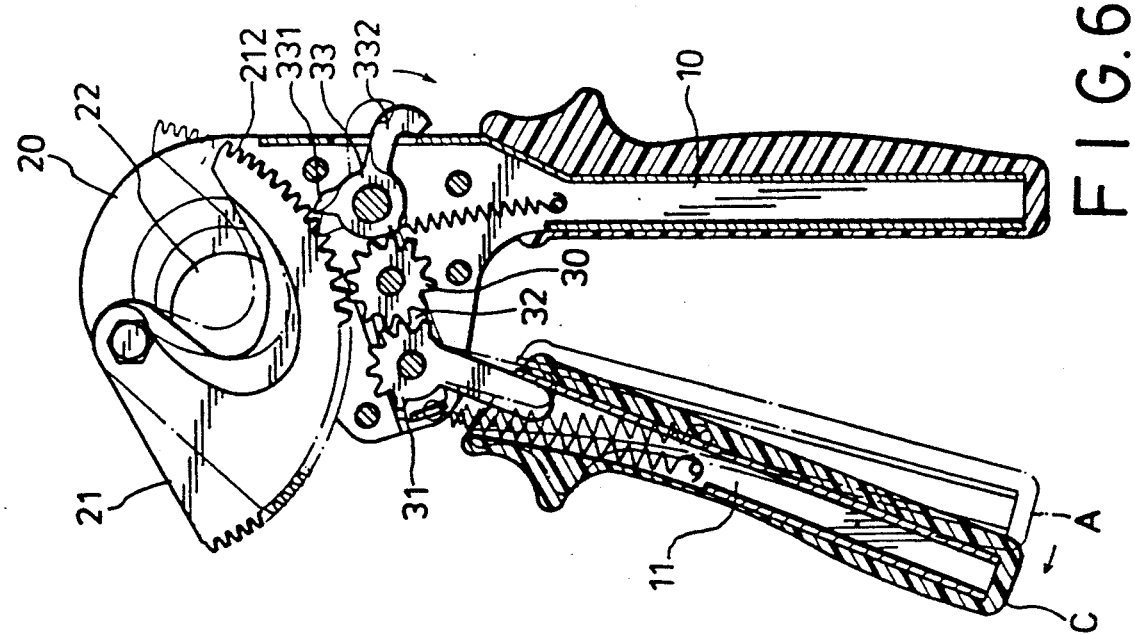
FIG. 6 is a sectional view of this invention showing disengagement between the toothed section of the movable cutting member and the gear member and the pawl member when the movable handle is in a release position.

FIG. 7 shows engagement between the gear member (30) and the toothed section (212) of the movable cutting member (21) when the movable cutting member (21) moves toward the fixed cutting member (2). The gear member (30) drives the movable cutting member (21) to pivot in the anticlockwise direction with a tangential force, and the frequency of contact between each of the teeth of the gear member (30) and the toothed section (212) is less than the above described prior one. The wear of the teeth of the gear member (30) does not easily occur. The wire cutter (W2) of this invention can have a long service life.

While the present invention has been described in connection with what is considered the most practical and preferred embodiment, it is understood that this invention is not limited to the disclosed embodiments but is intended to cover various arrangements included within the spirit and scope of the broadest interpretations and equivalent arrangements.

I claim:

1. A wire cutter comprising:

a fixed handle having an enlarged top end;

a movable handle having a top end pivoted to said enlarged top end of said fixed handle, said top end being provided with a gear means which is stationary relative to said movable handle;

an elongated plate having a first end and a second end, said gear means being pivoted to said plate adjacent to said first end;

a gear member pivoted to said plate adjacent to said second end and meshing with said gear means;

a fixed cutting member including a lower mounting portion fixed to said enlarged top end of said fixed handle and an upper curved cutting portion;

a curved movable cutting member pivoted to said cutting portion of said fixed cutting member to form a variable hole therebetween for receiving a wire therein, said movable cutting member having one side formed with a cutting section and another side formed with a toothed section;

an extension spring having one end connected to said first end of said plate and another end connected to said movable handle, said extension spring biasing said plate so that said plate inclines upwardly to permit engagement between said toothed section of said movable cutting member and said gear member; and a pawl member resiliently pivoted to said enlarged top end of said fixed handle adjacent to one side of said gear member opposite to said gear means, said pawl member normally engaging said toothed section and permitting movement of said movable cutting member in a first direction wherein said movable cutting member moves toward said cutting portion of said fixed cutting member;

said gear means rotatably driving said gear member when said movable handle is pressed toward said fixed handle from a normal position to a compressed position so as to cause said movable cutting member to pivot in said first direction and thereby decrease the size of said variable hole;

said pawl member resisting movement of said movable cutting member away from said cutting portion of said fixed cutting member to cause said gear means to urge said gear member and said plate to incline downwardly when said movable handle is released from said compressed position to said normal position so as to permit disengagement between said toothed section of said movable cutting member and said gear member.

2. A wire cutter as claimed in claim 1, wherein said mounting portion of said fixed cutting member is formed with an elongated groove to receive said plate and has a width larger than that of said plate.

3. A wire cutter as claimed in claim 1, wherein said fixed handle further has a flange extending from a periphery of the enlarged top end of the fixed handle toward the mounting portion of the fixed cutting member, said flange being formed with a recess, said pawl member having a lever portion extending out of said recess and being provided with a spring member which has one end connected to said pawl member and another end connected to said fixed handle.

* * * * *